March 17, 1959 R. D. PEEBLES ET AL 2,877,880
AUTOMATIC AUTOMOBILE BRAKE
Filed Feb. 28, 1955 2 Sheets-Sheet 1

INVENTORS
Robert D. Peebles and
Robert E. Peebles
BY Wooster & Davis ATTORNEYS

United States Patent Office 2,877,880
Patented Mar. 17, 1959

2,877,880

AUTOMATIC AUTOMOBILE BRAKE

Robert D. Peebles, Stratford, and Robert Edward Peebles, Nichols, Conn.

Application February 28, 1955, Serial No. 490,794

7 Claims. (Cl. 192—3)

This invention relates to an automatic automobile brake, and has for an object to provide such a brake in combination with the accelerator or speed control for the motor, which will automatically release the brakes when the control pedal is depressed, and also when the accelerator pedal is depressed from the idling position for driving the car, and will automatically apply the brakes when the control pedal is released and also when the accelerator pedal is released.

It is also an object to provide a brake system which will have ease in operation and safety in control of the vehicle, and with which the brakes may be applied as easily as desired and under perfect control, or as a panic stop.

Another object is to provide a device of this character which will act from lack of motive power to apply the brakes.

A further object is to provide a brake operating and control system which will prevent many accidents due to brakes being released by unauthorized persons or by accident, or by a person becoming ill or incapacitated while driving.

Still another object is to provide a brake control system of this character which may be applied to older cars, trucks and buses with either mechanical or hydraulic brakes, or may be built into new cars as a unit.

With the foregoing and other objects in view, we have devised the construction illustrated in the accompanying drawing forming a part of this specification. It is, however, to be understood the invention is not limited to the specific details of construction and arrangement shown, but may embody various changes and modifications within the scope of the invention.

Figures 1, 2:
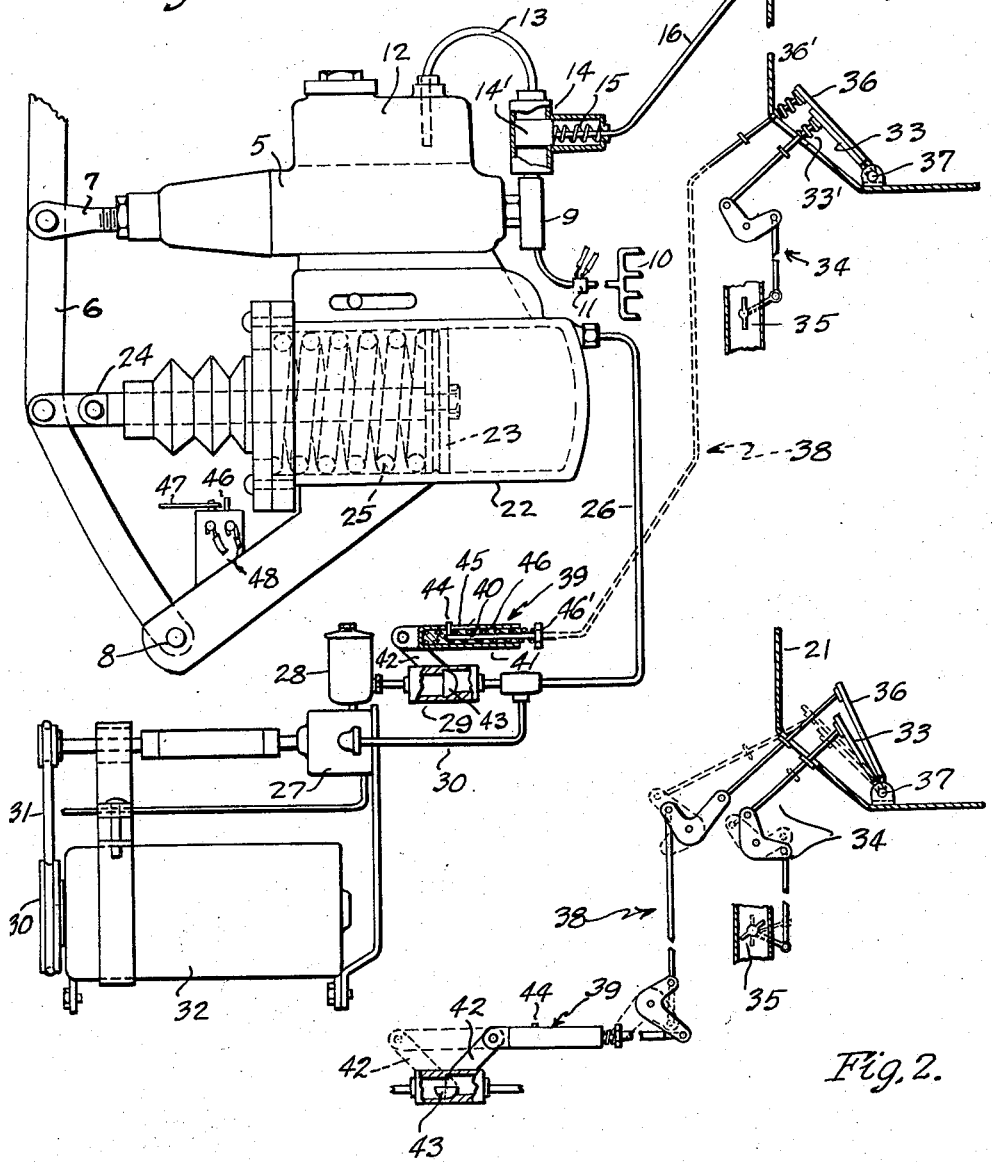
Figure 3:
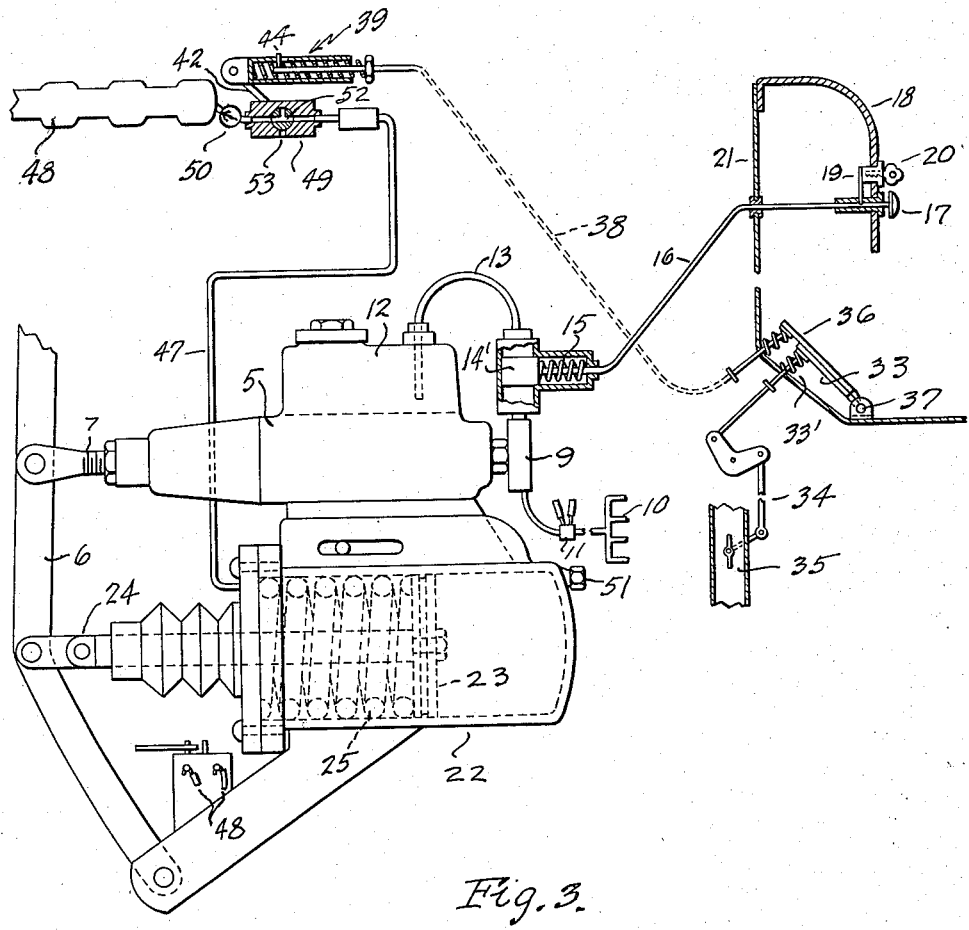

In this drawing:

Fig. 1 is a partial diagrammatic view showing the device as applied to a hydraulic brake system, with parts broken away to more clearly show the construction, and showing the various features in running or driving position for the motor vehicle with the brakes released, Fig. 2 is a diagrammatic view of the pedal controls showing them in position with the brakes applied, and Fig. 3 is a view similar to Fig. 1 showing a somewhat modified arrangement.

As above indicated, the invention is shown, for example, as applied to a hydraulic brake system for a motor car, but could be used as well for mechanical or other types of brakes as it does not require changes in the brake system itself as it functions with the brake operating means.

The master cylinder of the hydraulic brake system is shown at 5, the plunger or piston of which is operated by the brake lever 6 through the connection 7 to control the brakes (not shown) in the usual manner. This could be a separate lever if the device is built into a new car, or it could be the usual brake pedal, and is pivoted at 8. This lever therefore comprises means for operating or controlling operation of the brakes. The outlet connection from this cylinder to the brake cylinders (not shown) is indicated diagrammatically at 9 and 10, with the usual stop light control switch connected to it at 11. The usual reservoir for this cylinder is indicated at 12 connected to the outlet connection by connection 13 controlled and normally closed by a spring loaded valve 14 (the spring being indicated at 15), which may be released, for a purpose later to be described, by a connection 16 from a hand pull knob 17 on the dash 18 of the car, and controlled by a pin or other suitable locking means 19 which is in turn controlled by a key controlled lock 20. The valve member 14' is normally held in the closed position shown by spring 15. The usual fire wall forwardly of the dash is indicated at 21.

This device includes a control cylinder 22 in which is a piston 23 connected with brake lever 6 by the connection 24, and this piston is spring loaded by the heavy spring 25 tending to shift it to the right as viewed in the drawing. As pushing piston 23 to the right applies the brakes through lever 6 and master cylinder 5, this spring therefore tends to apply the brakes. Connected to the right hand end of cylinder 22, and at the opposite side of piston 23 from the compression spring 25, is a pipe 26 leading from a source of fluid pressure, such, for example, a pump 27 and reservoir 28. The pipe connection 26 between the reservoir 28 and cylinder 22 is controlled by a valve 29, and there is a connection 30 from the pump 27 to the pipe 26 between the valve 29 and the cylinder 22. If the device is used on a car provided with power steering, or power brakes, this pipe 30 could be connected to the pump supplying pressure for the power steering or power brakes, or if the device is used on a car provided with foot operated hydraulic brakes or foot operated mechanical brakes, then an auxiliary pump 27 and reservoir 28 would be provided, the pump being operated by any suitable means, such, for example, as the pulley 30 and belt 31 from the generator 32.

For control of the brakes and operation of the car there is provided the usual accelerator pedal or lever 33, in front of the driver's seat (not shown) and this is connected by the usual operating connection indicated diagrammatically at 34 with the usual carburetor valve 35 controlling the speed of the motor. A second pedal or lever 36 is provided over the pedal 33, and they may both be mounted on a common pivot 37. Suitably located springs 33' and 36' are provided tending to shift the respective pedals or levers to their upper or retracted positions. The pedal 33 could be any of the usual so-called accelerators or control means for the motor. This arrangement of pedals really provides a lost motion connection between control pedal 36 and accelerator pedal 33. The upper pedal or lever 36 is connected with the control valve 29 by any suitable means such as the connection shown diagrammatically at 38. This may include a yieldable spring connection 39, comprising a plunger rod 40 slidable in a hollow cylinder 41. The cylinder 41 is connected by a lever arm 42 to the rotatable valve member 43 in valve 29 and the rod 40 is connected to the connection 38. A pin 44 on the rod 40 slides in a slot 45 in the cylinder 41 with the opposite ends of the slot acting as limit stops for the pin. A spring 46 is on this rod between the inner end of the sleeve and an adjustable stop nut 46' threaded on the rod. The spring therefore provides a yieldable connection between the operating means 38 and the valve 43 which permits yielding after the valve reaches the limits of its movements to either the open or closed position.

The rotatable valve member 43 may be of any suitable construction to control passage of the pressure fluid through the valve 29 between the pump 27 and reservoir 28 or between the cylinder 22 and this reservoir. In the form shown it is substantially a half cylinder in cross section so that when lever 42 is in the left hand position of Fig. 1, or dotted line position of Fig. 2, the valve 43 is closed, as indicated, and when this lever is in the right hand or full line position of Fig. 2 the valve member 43 is in the full open position, as indicated.

A switch 46 may be provided, operated by a movable element 47 in the path of movement of lever 6 to be operated when this lever moves to a given position, as, for example, when the brake pedal goes down beyond the usual allowed two-inch clearance from the floor board, to close a circuit through leads 48 to a signal (not shown) to show the brakes need relining or adjusting.

The operation is as follows:

As previously indicated, the levers or pedals 33 and 36 are shown in Fig. 2 in their positions when the brakes are applied, the pedal or lever 36 being on top of or above the pedal or lever 33. In this position of pedal 36 the control valve 43 is in the open position of Fig. 2, and the fluid pressure, preferably liquid, from pump 27 is by-passed from pipe 30 through this valve into reservoir 28. There is therefore no fluid pressure against the right hand side of piston 23 and compressed or pre-loaded spring 25 has shifted it to the right, also shifting the lever 6 to the right and through master cylinder 5 has applied the brakes and is holding them in the applied position.

If now the operator depresses the pedal 36 he will, through the connection 38, operate the valve 43 toward the closed position of Fig. 1, so that pressure from the pump 27 will be applied through the pipe connection 26 to the right hand end of cylinder 22. This will force piston 23 to the left, compressing spring 25, and will shift brake lever 6 to the left and release the brakes. The position of the accelerator pedal 33 of Fig. 2 is the idling position for the engine. On depression of the pedal 36 from its released position of Fig. 2, as it reaches and engages the pedal 24 the valve 43 has been closed and the brakes released, and now further depression of pedal 36 will also depress accelerator pedal 33, which will increase the speed of the engine, while the brakes remain released. This further movement of pedal 36 is permitted by the yieldable spring connection 39. The engine speed will be controlled in the usual way by the more or less depression of both pedals from the position where pedal 36 engages pedal 33, the normal driving position being shown in the dotted line position of Fig. 2, which is also the full line position of Fig. 1. The car can thus be driven and its speed controlled in the usual manner by operation of the two pedals 36 and 33 the same as now done by the accelerator pedal.

However, if the pressure is taken off the pedal 36, allowing pedal 33 to return to the full line position of Fig. 2, but with pedal 36 resting on top of 33, the motor will idle with the brakes off, but further release of pedal 36 will open valve 43 so that pressure from pump 27 and cylinder 22 will be released into reservoir 28 more or less, depending on how much the pedal 36 is released. This will permit the compressed or loaded spring 25 to shift the piston 23 to the right and, operating through the brake lever 6, will operate the plunger in master cylinder 5 to apply the brakes in the usual manner. The same operation could be applied, of course, to other types of brakes, including mechanical brakes, as well as hydraulic brakes. Thus, as long as pedal 36 is released from the accelerator pedal the brakes are applied and the amount of application can be controlled by releasing the pedal 36 more or less. Thus the application and release of the brakes can be fully and accurately controlled by the pedal 36. In an emergency stop, if the driver's foot is taken off the pedal 36, the brakes will immediately and automatically be applied to the maximum, and also when the car is stopped with no pressure on pedal 36, the brakes are always held applied automatically.

Thus, if the operator should become unconscious or ill and remove his foot from the control pedal, the car will automatically be stopped. Also, in normal operation the car cannot be started without depressing pedal 36. However, should it be necessary to release the brakes for towing or similar operation, there is provided the valve 14, which is normally automatically closed so that any pressure from the master cylinder 5 will be applied to the brake cylinders, but by a connection 16 from this valve to the hand knob 17 this valve may be opened to permit release of pressure from the brake cylinders to the master cylinder reservoir 12, thus releasing the brakes. Unauthorized operation of this valve 14 and release of the brakes is prevented by a key controlled lock 20 normally locking the hand knob 17 against operation.

The automatically operating control cylinder 22 can be placed at any convenient position anywhere in the car. The device can be built into a new car or applied to any brake system in present cars.

As the control piston 23 is operated to brake released position by differential pressure, it will be understood that although it is shown and described as operated by pressure supplied to the cylinder 22 on the right hand side of the piston, it could be operated by a reduced pressure or partial vacuum applied to the cylinder on the left hand side of the piston from the motor intake manifold or a suction pump. In this case it is the pressure of the atmosphere which operates the piston 23 to the released position, instead of pressure from a pump. Also it will be understood that although the cylinder and spring operated and pressure released piston for operating the brake control means 6 is preferred, any device comprising a spring for operating the control means to set or apply the brakes and a pressure means for loading this spring and releasing the brakes may be used.

An arrangement for operating the piston 23 to released position by applying a reduced pressure or partial vacuum to the cylinder on the left hand side of the piston is shown in Fig. 3. As shown, the cylinder on the left hand side of the piston is connected by a pipe 47 to the motor intake manifold 48 through a control valve 49 and a check valve 50. The valve 49 is controlled from the pedal or lever 36 through the yieldable spring connection 39 the same as in the first form. When the pedal 36 is depressed as in Figs. 1 and 3, the valve 49 is open to connect the left hand end of cylinder 22 to the reduced pressure or suction in the manifold. As air is permitted to enter the right hand end of cylinder 22 through vent 51 this forces piston 23 to the left to release the brakes the same as in the first form. The check valve 50 will maintain the reduced pressure or partial vacuum in the cylinder 22 until the pedal 36 is released if the motor should stall or stop for any reason. When pedal 36 is released to the position of Fig. 2, valve 49 is shifted to cut off connection from the manifold to cylinder 22 and shift passage 52 to communication with inlet 53 to permit air to enter cylinder 22 and allow spring 25 to shift piston 23 to the right to apply the brakes the same as in the first form. Otherwise the action of the two arrangements is the same.

Having thus set forth the nature of our invention, we claim:

1. In a brake control system for motor cars including control means for the brakes and an accelerator pedal for controlling the motor, a control cylinder comprising a piston connected with the control means for operating it, a spring tending to shift the piston in a direction to operate the control means to apply the brakes, means for applying pressure to the piston to shift it in the opposite direction to release the brakes, and means for controlling application of said pressure to the piston comprising a control pedal having lost motion connection with the accelerator pedal so arranged that operation of the control pedal will first release the brakes before operation of the accelerator pedal.

2. In a brake control system for motor vehicles including control means for the brakes and an accelerator pedal for controlling the motor, means for operating said control means comprising a preloaded spring tending to operate the control means in a direction to apply the brakes, fluid pressure operated means for shifting the control means in the opposite direction to load the spring and release the brakes, and means controlling the application of fluid pressure to said pressure operated means comprising a control pedal having lost motion connection with the accelerator pedal so arranged that depression of the control pedal will first release the brakes before operation of the accelerator pedal.

3. In a brake control system for motor vehicles including control means for the brakes and an accelerator pedal for controlling the motor, means for operating said control means comprising a preloaded spring tending to operate the control means in a direction to apply the brakes, fluid pressure operated means for shifting the control means in the opposite direction to load the spring and reelase the brakes, a control pedal over the acclerator pedal, spring means for normally retaining the control pedal in retracted position spaced above the accelerator pedal, a valve for controlling the application of fluid pressure to said pressure operated means, and a connection from the control pedal to said valve operative to release the pressure from said pressure operated means and permit application of the brakes by said spring when the control pedal is released and to supply fluid pressure to said pressure operated means to release the brakes when the control pedal is depressed.

4. In a brake control system for motor cars including control means for the brakes and an accelerator pedal for controlling the motor, a control cylinder comprising a piston connected with the control means for operating it, a spring tending to shift the piston in a direction to operate the control means to apply the brakes, means for applying fluid pressure to the piston to shift it in the opposite direction to release the brakes, a control pedal having lost motion connection with the accelerator pedal, spring means normally retaining the control pedal in retracted position requiring a given operation of this pedal from this position before operating the accelerator pedal, a valve for controlling the application of fluid pressure to said piston, and a connection from the control pedal to the valve operable to supply fluid pressure to the piston during the lost motion operation of this pedal from the retracted position to shift the piston against action of the spring to release the brakes and permit operation of the accelerator pedal by further operation of the control pedal beyond the lost motion range.

5. In a brake control system for motor cars equipped with hydraulic brakes and a master cylinder including a master plunger capable of operating all of said brakes, a piston connected with said plunger for operating it, a loaded spring tending to shift said piston to operate the plunger to apply the brakes, means for applying a fluid pressure to said piston to shift it against action of the spring to load the spring and operate the plunger to release the brakes, a control pedal, a valve for controlling the application of fluid pressure to the piston, a connection from the control pedal to the valve operable to release the fluid pressure from the piston and permit application of the brakes by said spring when the control pedal is retracted, an electric switch operable by movement of the plunger to a given position in applying the brakes capable of operating a signal to indicate when the brakes need relining or adjusting, and spring means for shifting the control pedal to the retracted position when released.

6. In a brake control system for motor cars equipped with hydraulic brakes and a master cylinder including a plunger for operating said brakes and a supply reservoir for this cylinder, a connection from the outlet from this cylinder to the reservoir, a normally closed control valve in this connection, a piston connected with said plunger for operating it, a loaded spring tending to shift said piston to operate the plunger to apply the brakes, means for applying a fluid pressure to said piston to shift it against action of the spring to load the spring and operate the plunger to release the brakes, a control pedal, a valve for controlling application of fluid pressure to the piston, a connection from the control pedal to the valve operable to release the fluid pressure from the piston and permit application of the brakes by said spring when the control pedal is retracted, spring means for shifting the control pedal to the retracted position when released to permit application of the brakes by action of the first spring, manual means for operating the valve in the connection from the master cylinder to the reservoir to open this valve and release the pressure from the brakes to release them, and a key controlled means for locking said manual means inoperative.

7. In a brake control system for motor cars equipped with hydraulic brakes and a master cylinder including a master plunger capable of operating all of said brakes, means for operating said master plunger comprising a preloaded spring of sufficient strength and tending to operate said plunger in a direction to apply the brakes, fluid pressure operated means for shifting the plunger in the opposite direction to load the spring and release the brakes, an electric switch operable by movement of the plunger to a given position in applying the brakes capable of operating a signal to indicate when the brakes need relining or adjusting, and means operable by the driver of the vehicle for controlling the application of fluid pressure to said pressure operated means to control operation of said master cylinder plunger comprising a valve, a control pedal connected to said valve for operating it, and spring means for shifting the pedal to a retracted position.

References Cited in the file of this patent

UNITED STATES PATENTS

| | | |
|---|---|---|
| 2,031,741 | Smith | Feb. 25, 1936 |
| 2,126,849 | Weiss | Aug. 16, 1938 |
| 2,372,842 | Mossinghoff | Apr. 3, 1945 |
| 2,496,431 | Bertonneau | Feb. 7, 1950 |

FOREIGN PATENTS

| | | |
|---|---|---|
| 293,693 | Great Britain | Oct. 9, 1929 |